United States Patent
Chen

(10) Patent No.: US 7,204,632 B2
(45) Date of Patent: Apr. 17, 2007

(54) INTEGRAL LIGHT GUIDE PLATE AND SURFACE LIGHTING DEVICE INCORPORATING SAME

(75) Inventor: Mi-Chien Chen, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 215 days.

(21) Appl. No.: 10/739,573

(22) Filed: Dec. 17, 2003

(65) Prior Publication Data

US 2004/0130911 A1 Jul. 8, 2004

(30) Foreign Application Priority Data

Dec. 17, 2002 (TW) .............. 91220448 U

(51) Int. Cl.
G02F 1/13357 (2006.01)
(52) U.S. Cl. .............. 362/613; 362/620; 362/626; 385/129; 349/65
(58) Field of Classification Search .............. 362/613, 362/620, 626; 385/129; 349/65
See application file for complete search history.

(56) References Cited

U.S. PATENT DOCUMENTS

| 4,229,783 | A | * | 10/1980 | Eberhardt | 362/352 |
|---|---|---|---|---|---|
| 4,714,983 | A | * | 12/1987 | Lang | 349/65 |
| 5,046,826 | A | * | 9/1991 | Iwamoto et al. | 349/65 |
| 5,249,104 | A | * | 9/1993 | Mizobe | 362/605 |
| 5,438,484 | A | | 8/1995 | Kanda et al. | |
| 5,479,275 | A | * | 12/1995 | Abileah | 349/62 |
| 5,575,549 | A | * | 11/1996 | Ishikawa et al. | 362/625 |
| 5,584,556 | A | * | 12/1996 | Yokoyama et al. | 362/625 |
| 5,598,280 | A | * | 1/1997 | Nishio et al. | 362/627 |
| 5,726,722 | A | * | 3/1998 | Uehara et al. | 349/66 |
| 5,986,728 | A | * | 11/1999 | Bernard | 349/65 |
| 6,700,633 | B2 | * | 3/2004 | Cho | 349/65 |
| 6,874,902 | B2 | * | 4/2005 | Yamashita et al. | 362/620 |
| 2001/0049893 | A1 | * | 12/2001 | Maas et al. | 362/31 |
| 2001/0055458 | A1 | * | 12/2001 | Ladd | 385/129 |
| 2002/0024803 | A1 | * | 2/2002 | Adachi et al. | 362/31 |
| 2004/0042194 | A1 | * | 3/2004 | Hsieh | 362/31 |
| 2004/0076010 | A1 | * | 4/2004 | Kuo | 362/332 |

* cited by examiner

Primary Examiner—Sandra O'Shea
Assistant Examiner—Ismael Negron
(74) Attorney, Agent, or Firm—Wei Te Chung

(57) ABSTRACT

A light guide plate (32), which is made from a transparent plastic sheet, defines an emission surface (37) and a bottom surface (35) on a top end and a bottom end respectively. A number of arcuate recesses (34) are defined in the bottom end thereof. The arcuate recesses are parallel to each other, and adjacent arcuate recesses are separated each other a uniform predetermined distance. A surface lighting device (3) incorporating such light guide plate further includes a number of light sources (31) received in the arcuate recesses respectively, and a reflection board (31) arranged adjacent the bottom surface for reflecting light.

17 Claims, 3 Drawing Sheets

INTEGRAL LIGHT GUIDE PLATE AND SURFACE LIGHTING DEVICE INCORPORATING SAME

BACKGROUND OF THE INVENTION

1. Field of the Invention

The present invention relates to a light guide plate for liquid crystal displays and a surface lighting device incorporating the light guide plate, and more particularly to a light guide plate having a large size display surface as well as uniform and intensified luminance over the entire surface.

2. Description of Prior Art

Surface lighting devices are capable of emitting light uniformly over a wide area, and are thus suitably applicable for various light sources. In particular, a liquid crystal panel in a liquid crystal display (LCD) does not itself emit any light. Usually, the liquid crystal panel is, illuminated from its rear side using a light source. This improves display conditions and quality, for easier observation of images displayed on the LCD.

Light emitting from a surface lighting device serving as a backlight source is required to have a luminance that is uniform and strong over an entire light emission surface. In addition, power consumption should be low and lighting efficiency high, and the surface lighting device should be small and lightweight.

Referring to FIG. 3, a conventional backlight module 1 includes a light source 11, a wedge-shaped light guide plate 12, a reflection board 13, a diffusion board 14 and two prisms 15. In addition, the light source 11 is covered with a lamp shield 111 for reflecting light back into the light guide plate 12, so as to improve a lighting efficiency of the light source 11. Incident rays of light emitting from the light source 11 transmit directly through an incident side (not labeled) into the light guide plate 12, or are reflected back into the incident side of the light guide plate 12 by the lamp shield 111. The light rays are uniformed by the light guide plate 12 and the diffusion board 14, and then emit from the backlight module 1. However, the backlight module 1 has a high luminance in a vicinity of the light source 11, and a low luminance far from the light source 11. If the light guide plate 12 has a particularly large surface area, a difference between the low luminance and the high luminance is very significant. Therefore, this kind of light guide plate is not suitable for a large-sized liquid crystal display.

Referring to FIG. 4, U.S. Pat. No. 5,438,484 discloses an improved large-sized surface lighting device 2 and its application in an LCD. The surface lighting device 2 comprises a light guide plate 22, which is divided into two light guide portions 221, 222 at a center thereof. The light guide portions 221, 222 are bonded by a transparent adhesive, thereby forming a junction 23. A pair of light sources 211, 212 is arranged adjacent two lateral incident sides 241, 242 of the light guide portions 221, 222 respectively. Incident rays of light emitting from the light sources 211, 212 transmit directly into the light guide portions 221, 222 through the incident sides 241, 242 respectively, and then emit from adjacent light emission surfaces 25 of the light guide plate 22. Some of the rays of light are reflected back by the junction 23, so that a luminance in a vicinity of the central portion of the light guide plate 22 at the junction 23 is intensified. Thus, relatively high luminance exists both at the central portion of the light guide plate 22 and at portions of the light guide plate 22 in the vicinities of the incident sides 241, 242 respectively. Yet the intensity of high luminance at the central portion of the light guide plate 22 is generally different from the intensities of high luminance at the portions of the light guide plate 22 in the vicinities of the incident sides 241, 242. In addition, relatively low luminance exists in intermediate portions of the light guide plate 22 that are between the central portion and said portions at the incident sides 241, 242 respectively. That is, differences between the high luminance portions and the low luminance portions are still a problem. If the light guide plate 12 has a particularly large surface area, the differences between the low luminance and the high luminance are very significant. Moreover, an overall luminance of the entire display surface is necessarily reduced.

SUMMARY OF THE INVENTION

Accordingly, an object of the present invention is to provide a light guide plate having a large display surface as well as uniformly high luminance;

Another object of the present invention is to provide a surface lighting device incorporating such a light guide plate.

In order to achieved the objects set above, a light guide plate which is made of a transparent flat sheet has a top surface on a top end, a bottom surface on an opposite bottom end, and a plurality of arcuate recesses defined in the bottom end thereof. Adjacent arcuate recesses are separated from each other a uniform predetermined distance. The light guide plate can be made as desired large size as needed. Preferably, a diffusion pattern is formed on the top surface and/or on the bottom surface of the light guide plate. A surface lighting device incorporating the light guide plate is also disclosed. The surface lighting device comprises a plurality of light sources. The light sources are received in the arcuate recesses of the light guide plate respectively, and a reflection board is arranged adjacent the bottom surface of the light guide plate for reflecting light back into the light guide plate.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Figure 1:
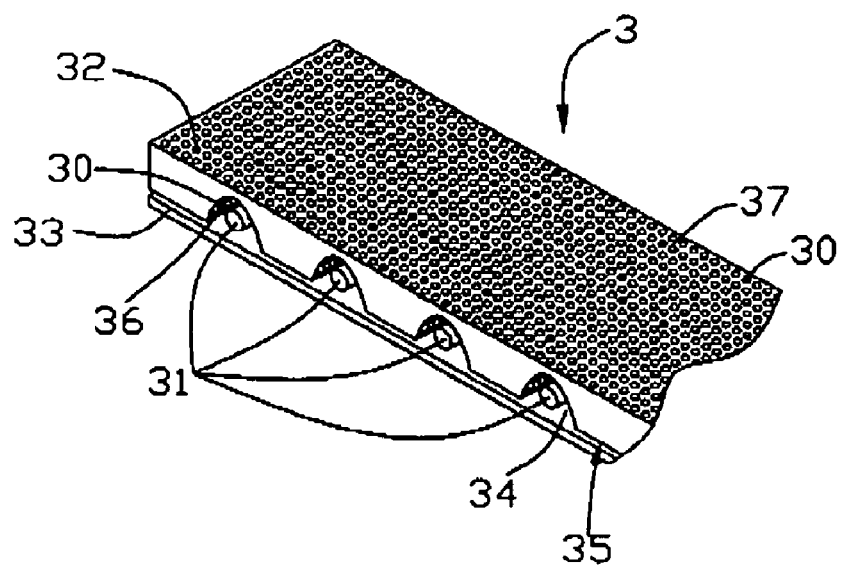
FIG. 1 is an isometric view of part of a surface lighting device in accordance with a first preferred embodiment of the present invention.
Figure 2:
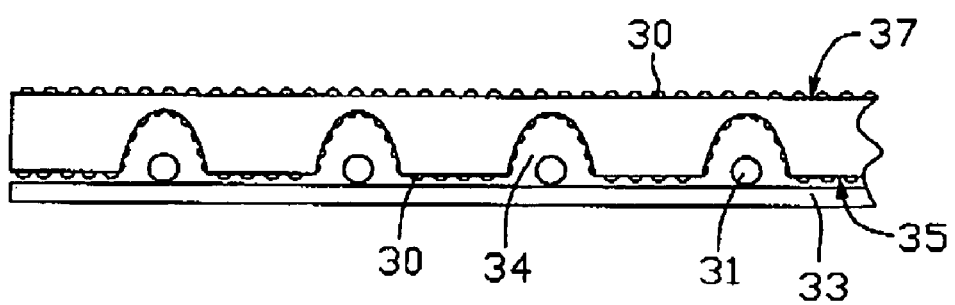
FIG. 2 is a schematic side view of the surface lighting device, shown in FIG 1.
Figure 3:
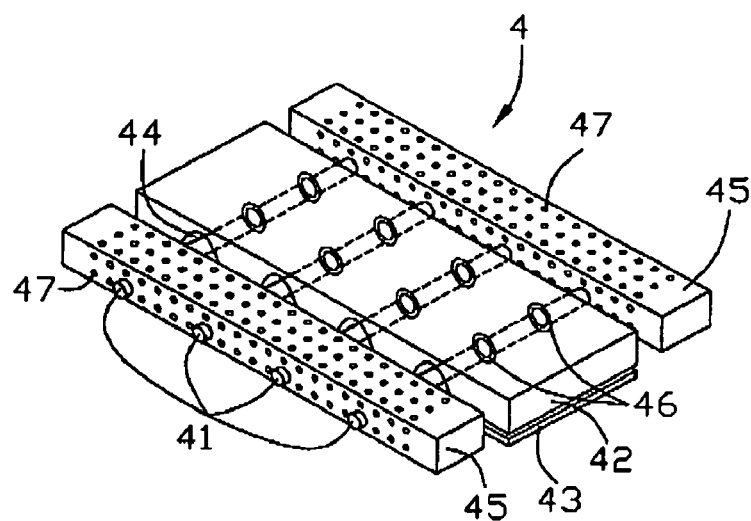
FIG. 3 is an isometric view of a surface lighting device in accordance with a second preferred embodiment of the present invention.
Figure 4:
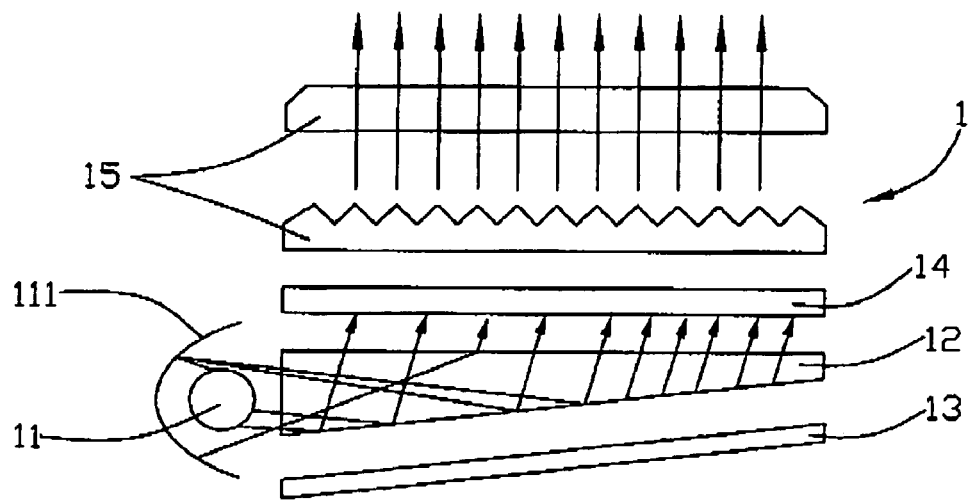
FIG. 4 is a schematic side elevation of a conventional backlight module for a liquid crystal display.
Figure 5:
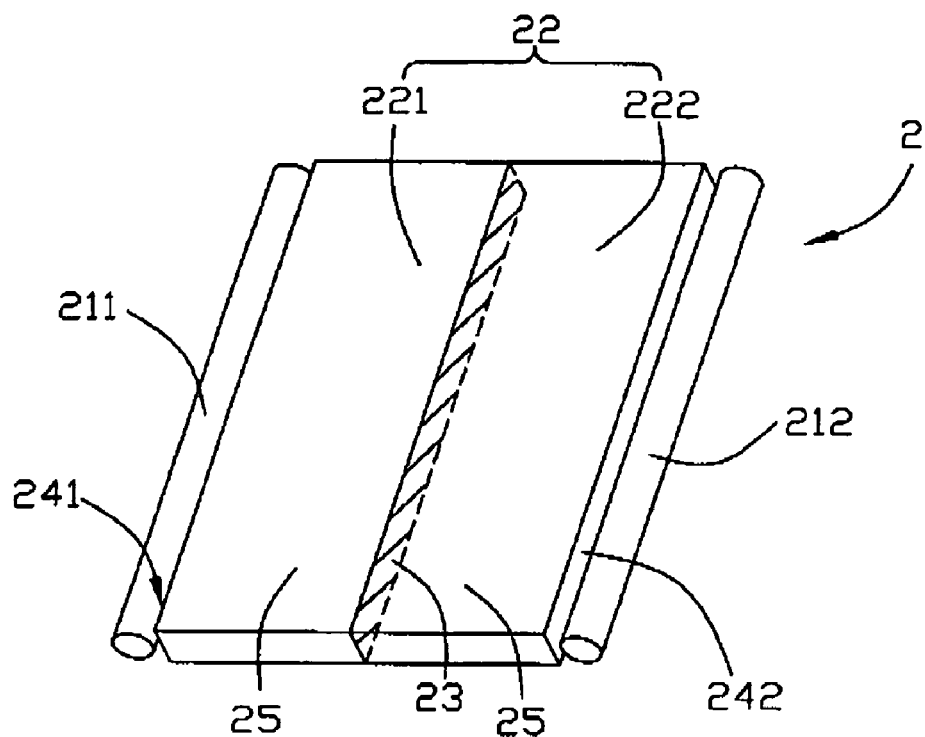
FIG. 5 is an isometric view of a conventional surface lighting device having two light guide portions bonded together.

Referring to FIGS. 1 and 2, a surface lighting device 3 in accordance with the first preferred embodiment of the present invention comprises a light guide plate 32, a reflection board 33 capable of reflecting light, and a plurality of light sources 31. The light guide plate 32, which is substantially a flat sheet, defines a bottom surface 35 on a bottom end (not labeled) thereof, and an emission surface 37 on a top end (not labeled) thereof. The emission surface 37 is opposite and parallel to the bottom surface 35. Preferably, a diffusion pattern 30 is formed on the bottom surface 35 and/or on the emission surface 37. The diffusion pattern 30 improves a uniformity and intensity of luminance of light that emits from the light guide plate 32.

A plurality of arcuate recesses 34 is defined in the bottom end of the light guide plate 32. The arcuate recesses 34 are parallel to each other, and adjacent arcuate recesses 34 are spaced apart from each other a uniform predetermined distance. Each arcuate recess 34 spans an entire width of the light guide plate 32. The light guide plate 32 thus defines an arcuate incident surface 36 at each arcuate recess 34. The light sources 31 are accommodated in the recesses 34 respectively. The reflection board 33 is arranged adjacent the bottom surface 35 of the light guide plate 32. In use, most of light emitting from each light source 31 enters the light guide plate 32 through the corresponding arcuate incident surface 36, and the remainder of the emitted light is reflected by the reflection board 33 back to the light guide plate 32. Therefore, an efficiency of light transmission of the light sources 31 is improved.

Generally, the light sources 31 for a large-sized associated display are cold cathode fluorescent lamps (CCFL). In order to accommodate the light sources 31, a diameter of each arcuate recess 34 must be greater than that of the light source 31. In the first preferred embodiment of the present invention, a thickness of the light guide plate 32 is in the range from 6 mm to 10 mm. A diameter of each light source 31 is in the range from 2 mm to 2.4 mm, and a diameter of each arcuate recess 34 is controlled to be in the range from 3 mm to 3.4 mm during manufacturing. Thereby, each cold cathode fluorescent lamp can be arranged in the corresponding recess 34 without contacting the light guide plate 32.

The light guide plate 32 is made of a transparent plastic material, such as acrylic resin. The acrylic resin is melted and shaped into a flat sheet, preferably with the diffusion pattern 30 formed thereon. Alternatively, the diffusion pattern 30 can be formed by a subsequent printing process. The flat sheet is cut into a desired size as needed, machined with a machine tool or a cuffing tool to form the plurality of arcuate recesses 34. The light guide plate 32 can be made to a desired large size as needed, provided tat the light guide plate 32 does not bend or break.

It is noted tat the number of the light sources 31 and the distance between two adjacent light sources 31 can be altered by changing a number of the situate recesses 34 and said distance. Thereby, a luminance of light emitting from the light guide plate 32 is uniform, and can be intensified over an entire surface of the associated display. In addition, the diffusion pattern 30 of the light guide plate 32 may also be altered, in order to further umiform the luminance.

In use, the light sources 31 emit light. The light directly enters the light guide plate 32, or is reflected by the reflection board 33 into the light guide plate 32 after diffusion by the diffusion pattern 30 of the bottom surface 35. Finally, the light is uniformed by the light guide plate 32, diffused by the diffusion pattern 30 of the emission surface 37, and emits from the emission surface 37.

Referring to FIG. 2, a surface lighting device 4 in accordance with the second preferred embodiment of the present invention comprises a reflection board 43 capable of reflecting light, a light guide plate 42, a plurality of light sources 41 received in the light guide plate 42, a plurality of annular bearings 46 separating the light sources 41, and two support arms 45 holding the light sources 41. The light guide plate 42 is substantially a flat sheet made from transparent plastic material. The light guide plate 42 defines a plurality of parallel, spaced apart recesses 44 for receiving the light sources 41. The light sources 41 may, for example, be cold cathode fluorescent lamps. The annular bearings 46 are made from a transparent, heatproof material such as silicon rubber. Each light source 41 is inserted through two annular bearings 46, so that the light source 41 is separated from the light guide plate 42 by the annular bearings 46. The support arms 45 can also be made from silicon rubber, and are arranged at two opposite lateral sides of the light guide plate 42 respectively. Opposite ends of each light source 41 extend into the support arm 45, so that the light source 41 is held by the support arms 45. Preferably, a plurality of through holes 47 is defined in each support arm 45, for dispersing heat generated by the light sources 41.

Unlike in the prior art, the light guide plate 32, 42 of the present invention can be fabricated to a desired large size as needed without the need to join two separate light guide portions. Accordingly, the light guide plate 32, 42 has improved uniformity and intensity of luminance over the entire surface of the associated display.

It is understood that the invention may be embodied in other forms without departing from the spirit thereof. Thus, the present examples and embodiments are to be considered in all respects as illustrative and not restrictive, and the invention is not to be limited to the details given herein.

The invention claim is:

1. A surface lighting device comprising:
   at least three light sources;
   a light guide plate having a top surface on a top end, a bottom surface on an opposite bottom end, and at least three arcuate recesses defined in the bottom end; and
   a reflection board capable of reflecting light arranged adjacent the bottom surface of the light guide plate; wherein
   each of the at least three arcuate recesses spans an entire width of the light guide plate, adjacent arcuate recesses are separated from each other a uniform predetermined distance, and the light sources are received in the arcuate recesses respectively, wherein a distance between each two adjacent arcuate recesses is substantially equal to a distance between another two adjacent arcuate recesses, and
   further wherein each of the light sources is received through a plurality of annular bearings, whereby the light source is separated from the light guide plate by the annular bearings.

2. The surface lighting device as described in claim 1, wherein the arcuate recesses are substantially parallel to each other.

3. The surface lighting device as described in claim 1, wherein the top surface and the bottom surface of the light guide plate are parallel to each other.

4. The surface lighting device as described in claim 1, wherein the light guide plate is made of transparent plastic material.

5. The surface lighting device as described in claim 1, wherein the top surface of the light guide plate comprises a diffusion pattern formed thereon.

6. The surface lighting device as described in claim 1, wherein the bottom surface of the light guide plate comprises a diffusion pattern formed thereon.

7. The surface lighting device as described in claim 1, wherein the light sources are cold cathode fluorescent lamps.

8. The surface lighting device as described in claim 1, wherein a diameter of each light source is less than that of the corresponding arcuate recess, whereby the light source does not contact the light guide plate.

9. The surface lighting device as described in claim 1, wherein the light sources are adapted for emitting light, and the light at least one of directly enters the light guide plate and is reflected by the reflection board into the light guide plate after diffusion by the diffusion pattern.

10. The surface lighting device as described in claim 1, wherein a pair of support arms is arranged adjacent two opposite lateral sides of the light guide plate respectively.

11. The surface lighting device as described in claim 10, wherein each of the light sources is supported by the pair of support arms.

12. A surface light system comprising:
- a light guide plate defining opposite light emitting face and light incident face in a vertical direction;
- at least three spaced arcuate recesses formed in said light incident face and extending through said light guide plate in a direction perpendicular to said vertical direction, wherein adjacent arcuate recesses are separated from each other by a uniform predetermined distance, wherein a distance between each two adjacent arcuate recesses is substantially equal to a distance between another two adjacent arcuate recesses; and
- a plurality of elongated light sources disposed in the corresponding recesses, respectively; wherein
- two opposite ends of each of said elongated light sources are fixed beside two opposite lateral sides of the light guide plate, and each of the light sources is received through a plurality of annular bearings.

13. The surface light system as described in claim 12, wherein the light emitting face and the light incident face are parallel to each other.

14. The surface light system as described in claim 12, wherein the light emitting face comprises a diffusion pattern formed thereon.

15. The surface light system as described in claim 12, wherein the light incident face comprises a diffusion pattern formed thereon.

16. The surface light system as described in claim 12, wherein the arcuate recesses are substantially parallel to each other.

17. A surface lighting device, comprising:
- at least three light sources;
- a light guide plate having a top surface, a bottom surface opposite the top surface, and at least three arcuate recesses defined in the bottom surface, the bottom surface having a diffusion pattern thereon, each arcuate recess having a plurality of annular bearings formed thereon, each light source being received in a respective arcuate recess, each light source being separated from the light guide plate by the annular bearings corresponding to a given respective arcuate recess; and
- a reflection board capable of reflecting light arranged adjacent the bottom surface of the light guide plate.

* * * * *